(12) United States Patent
Sing

(10) Patent No.: US 6,890,398 B2
(45) Date of Patent: May 10, 2005

(54) METHOD OF MAKING STRUCTURAL CELLULAR CORES SUITABLE TO USE OF WOOD

(75) Inventor: Peter Sing, P.O. Box 1691, McLeary, WA (US) 98557

(73) Assignee: Peter Sing, McCleary, WA (US)

( * ) Notice: Subject to any disclaimer, the term of this patent is extended or adjusted under 35 U.S.C. 154(b) by 25 days.

(21) Appl. No.: 10/046,182

(22) Filed: Jan. 14, 2002

(65) Prior Publication Data
US 2003/0131922 A1 Jul. 17, 2003

(51) Int. Cl.$^7$ ............................................... B23B 31/00
(52) U.S. Cl. .................. 156/254; 156/264; 156/265; 156/290; 156/297; 156/182; 156/512; 156/560; 144/344; 144/346; 52/742.1; 52/742.19; 52/783.1; 52/784.11; 52/793.1; 52/793.11; 52/794.1
(58) Field of Search ................... 156/265, 297, 156/182, 512, 560, 254, 256, 264, 290, 291, 292; 52/783.1, 784.11, 793.1, 793.11, 794.1, 742.1, 742.19; 144/344, 346, 350, 351, 352

(56) References Cited

U.S. PATENT DOCUMENTS 322,722 A * 7/1885 Mankey ...................... 144/350

* cited by examiner

Primary Examiner—Linda Gray
(74) Attorney, Agent, or Firm—Delbert J Barnard

(57) ABSTRACT

The fundamental technique of the method for making cellular cores is to make stacks of components which are configured such that cutting slices off the stacks produces cellular cores and, when needed, components used in stacks used to produce cellular cores. One of the basic components used in the stacks is termed a ribbed ply which is a ply (thin sheet of material such as wood) with a number of ribs (long thin strips of material such as wood) attached to the ply, parallel to each other. If the spaces between the ribs are filled with filler material such as foam plastic, the cells in the cellular core will be filled with the filler material. The filler material is introduced as layers of the material stacked alternately with plies and adhesively attached. Slices of such a stack, sliced parallel to the grain of the plies (if wood) are called ribbed fillers. Stacking ribbed fillers and plies produces a stack having a cross section which, when sliced, produces filled cell cellular cores.

4 Claims, 4 Drawing Sheets

METHOD OF MAKING STRUCTURAL CELLULAR CORES SUITABLE TO USE OF WOOD

BACKGROUND OF THE INVENTION

1. Field

The subject invention is in the field of structures which comprise primarily a core and one or two thin panels or pieces attached to the core.

2. Prior Art

Common examples of structure using such cores are (1) solid core doors in which the cores are solid wood and the panel(s) wood veneer; (2) aircraft structures which comprise metal panels (surfaces) and honeycomb plastic cores; and (3) boat hull structure comprising balsa wood cores and fiberglass structural surfaces. Foam plastic is a commonly used core material, used independently or as a filler in honeycomb cores. The practical and economic utility of each kind of core structure depends on many factors, primarily strength to weight ratio, stiffness to weight ratio, material costs, manufacturing costs, durability and variety of practical applications.

It has long been known in the art that wooden cores offer significant advantages because of the unique physical properties of wood, such as high strength to weight and high stiffness to weight ratios. However, because of these and other characteristics, wood is not well adapted to any known conventional techniques for making celled cores and making celled cores with known unconventional techniques is also considered to be too expensive.

Accordingly, the primary objective of the subject invention is to provide a method which enables economically acceptable manufacture of cellular cores made of wood. A secondary objective is that the method not involve the making and handling of parts which are small relative to the size of the cellular core.

SUMMARY OF THE INVENTION

The subject invention is a method of making structural cellular cores which are suitable to the use of wood. For purposes of this disclosure, a ply is a thin, flat sheet of material. A rib is a thin strip of material having its long edges parallel. A ribbed ply is a ply with a plurality of ribs each attached at one of their long edges to the ply, spaced apart, parallel to each other and distributed over one face of the ply. A filler sheet is sheet of material having appropriate qualities and dimensions for filling the cells of a core produced by the subject method. A filler/ply component is a ply adhesively attached to a filler sheet. A filler ply stack is a stack of filler/ply components adhesively attached, forming a stack of alternating plies and filler sheets, to a designated height. A ribbed ply stack is a stack of ribbed plies adhesively attached, ply, ribs, ply, ribs, to a designated height. A filler ribbed ply has filler material between the ribs. A hollow ribbed ply does not. A hollow core is a slice cut off of a ribbed ply stack perpendicular to the ribs in the stack. A filled core is a slice cut off of a stack of filled rib plies.

The ribs on all ribbed plies have free edges.

In disclosing the subject method, materials needed are considered to be available so that providing them is not included in the steps of the method.

The method of making cellular cores suitable to use of wood comprises the steps of:

1) providing a plurality of ribbed plies;

2) creating a ribbed ply stack by adhesively attaching the plurality of ribbed plies together with the ply of each ribbed ply against the free edges of the ribs on adjacent ribbed ply; and 3) creating a plurality of cellular cores by cutting slices off the ribbed ply stack, cutting perpendicular to the ribs.

The method for making specifically a hollow cellular core comprises the steps of:

1) creating a plurality of hollow ribbed plies;

2) creating a stack of hollow ribbed plies by adhesively attaching the plurality of hollow ribbed plies together with the ply of each hollow ribbed ply against the free edges of the ribs of an adjacent hollow ribbed ply; and 3) creating hollow cellular cores by cutting slices off the hollow ribbed ply stack, cutting perpendicular to the ribs.

The method for making a hollow ribbed ply for use in making a hollow cellular core comprises the steps of:

a) providing a ply;

b) providing a plurality of ribs;

c) providing a fixture for holding the ribs parallel to each other with one set of edges of the ribs in a flat plane and exposed above the fixture;

d) installing the ribs in the fixture;

e) adhesively attaching the ply to the free edges of the ribs;

f) allowing the adhesive used for the adhesive attachment to cure; and g) removing the hollow ribbed ply from the fixture.

The method for making specifically a filled cellular core comprises the steps of:

1) providing a plurality of filled rib slices;

2) providing a plurality of plies;

3) making a stack of the plies and filled rib slices, stacked alternately and adhesively attached to each other; and 4) slicing filled cellular cores from the stack, cutting perpendicular to the ribs.

The method for making a plurality of filled ribbed slices comprises the steps of:

a) providing a plurality of plies;

b) providing a plurality of filler layers;

c) making a stack of alternate plies and filler layers, adhesively attached to each other; and d) making a plurality of filled ribbed plies by slicing them from the stack, slicing perpendicular to the ribs.

The invention is described in more detail below with reference to the attached drawings:

DETAILED DESCRIPTION OF THE INVENTION

Figure 1:
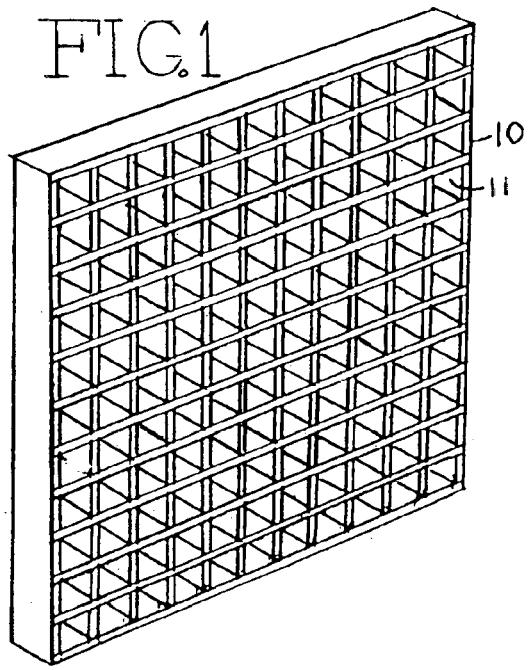
FIG. 1 illustrates a hollow celled core.
Figure 2:
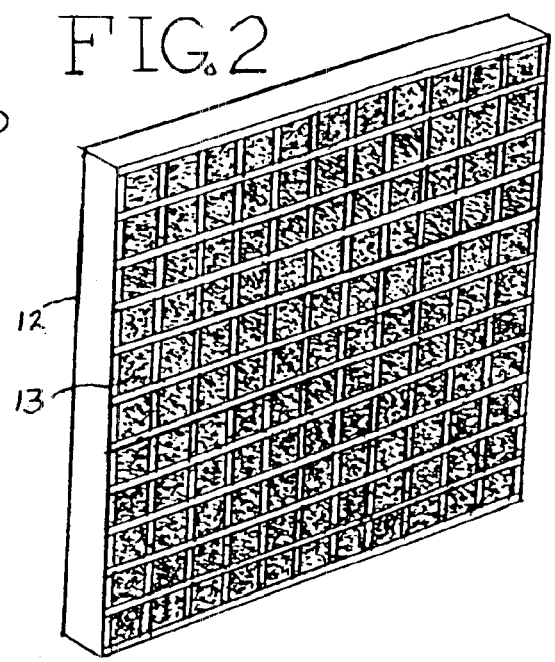
FIG. 2 illustrates a filled cell core.

The subject invention is a method of making structural cellular cores which accommodates the use of wood. FIG. 1 illustrates a hollow cellular core 10 with hollow (non-filled) cells, cell 11 being typical. FIG. 2 illustrates a filled cell core 12. The cells, cell 13 being typical, are filled with any of a variety of materials, foam plastic being a typical example.

Figure 3:
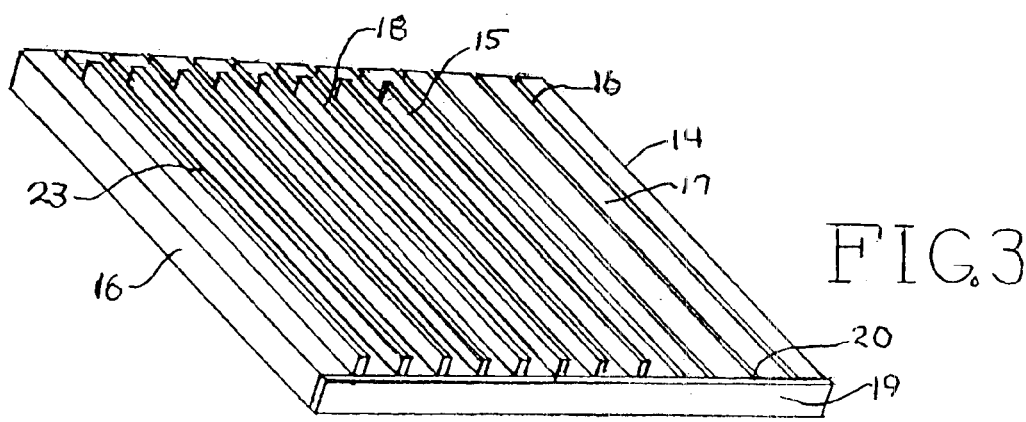
FIG. 3 illustrates a rib holding fixture with some ribs being held.

FIGS. 3 through 9 illustrate assemblages used in implementing the subject method. FIG. 3 illustrates a rib holding fixture 14 holding some ribs, rib 15 being typical. The fixture comprises a flat block 16 of suitable material, wood for example, having a plurality of slits, slit 16 being typical, in one of the blocks broad surfaces 17. The ribs, rib 18 being typical, are elongated, thin strips of material, wood for example. The width of the strips is greater than the depth of the slits so that when the ribs are seated in the slits, the ribs protrude from the slitted surface. Stop piece 19 closes off the ends, end 20 being typical, of the slits and serves to position the ribs evenly lengthwise.

Figure 4:
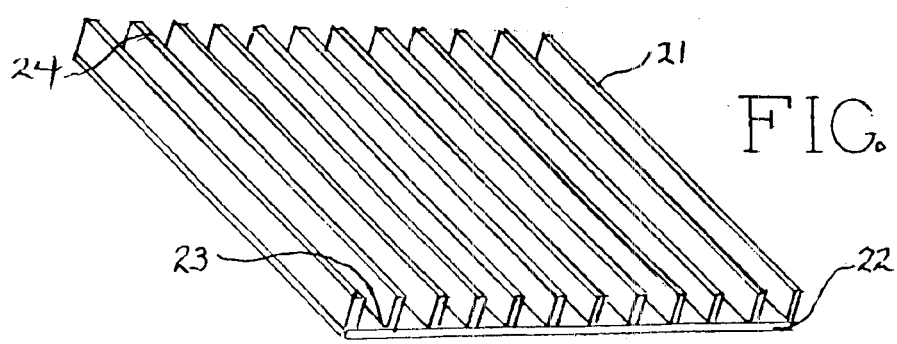
FIG. 4 illustrates a hollow ribbed ply.

FIG. 4 illustrates a hollow ribbed ply 21, made by adhesively attaching ply 22 to the exposed edges, edge 23 being typical, of ribs situated in the fixture. Each of the ribs has a free edge, edge 24 being typical.

Figure 5:
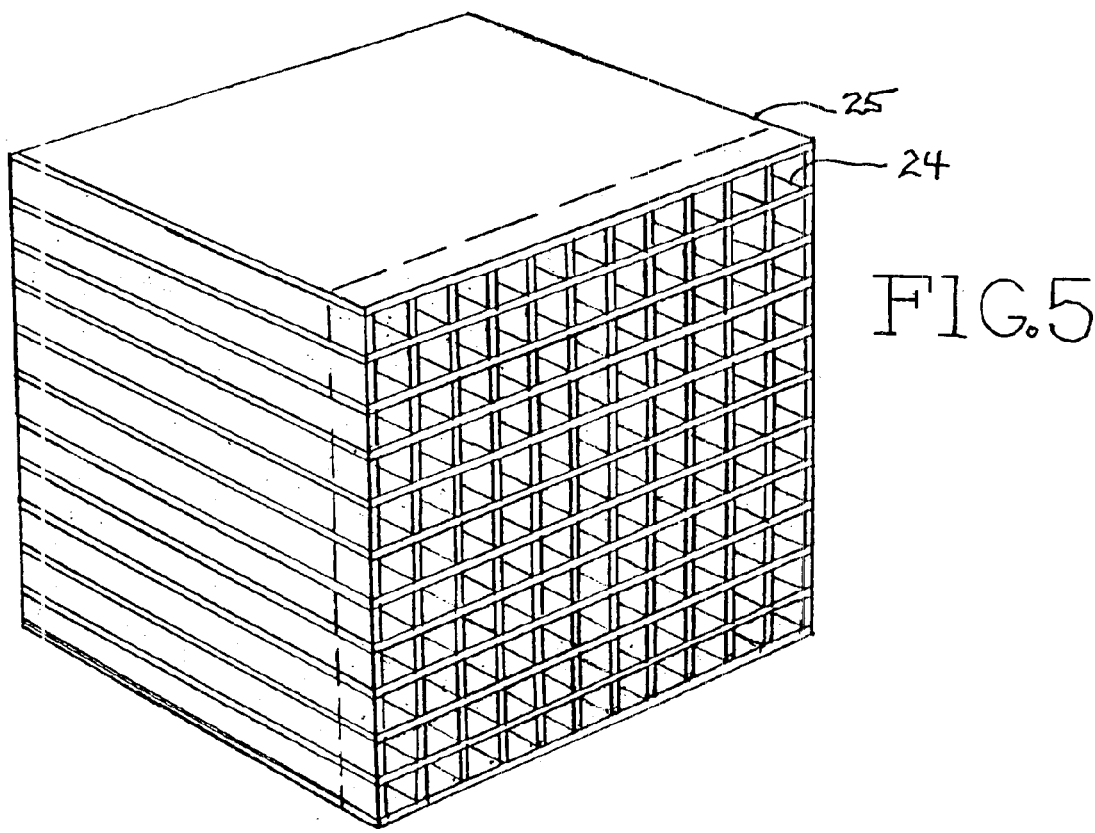
FIG. 5 illustrates a stack of hollow ribbed plies.

FIG. 5 illustrates a stack 25 of hollow ribbed plies. The stack is made by adhesively attaching hollow ribbed plies together with free edges, free edge 24, FIG. 4 being typical, attached to the plies of adjacent hollow ribbed plies. Hollow cellular cores, FIG. 1, are made by slicing them from the stack of hollow ribbed plies perpendicular to the ribs in the stack, as indicated by the dashed lines.

Figure 6:
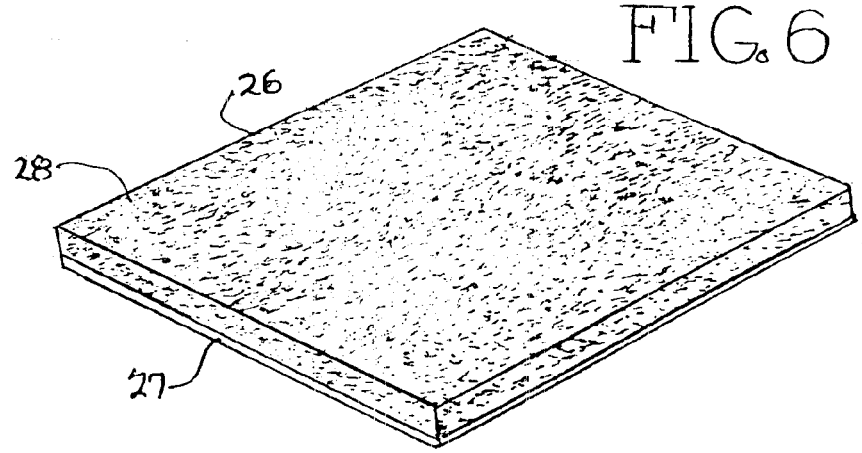
FIG. 6 illustrates a filler/ply component.

FIG. 6 illustrates a filler ply assemblage 26 which is made by adhesively attaching ply 27 to filler material 28, a sheet of material, foam plastic for example, which will ultimately fill the cells of filled cellular cores.

Figure 7:
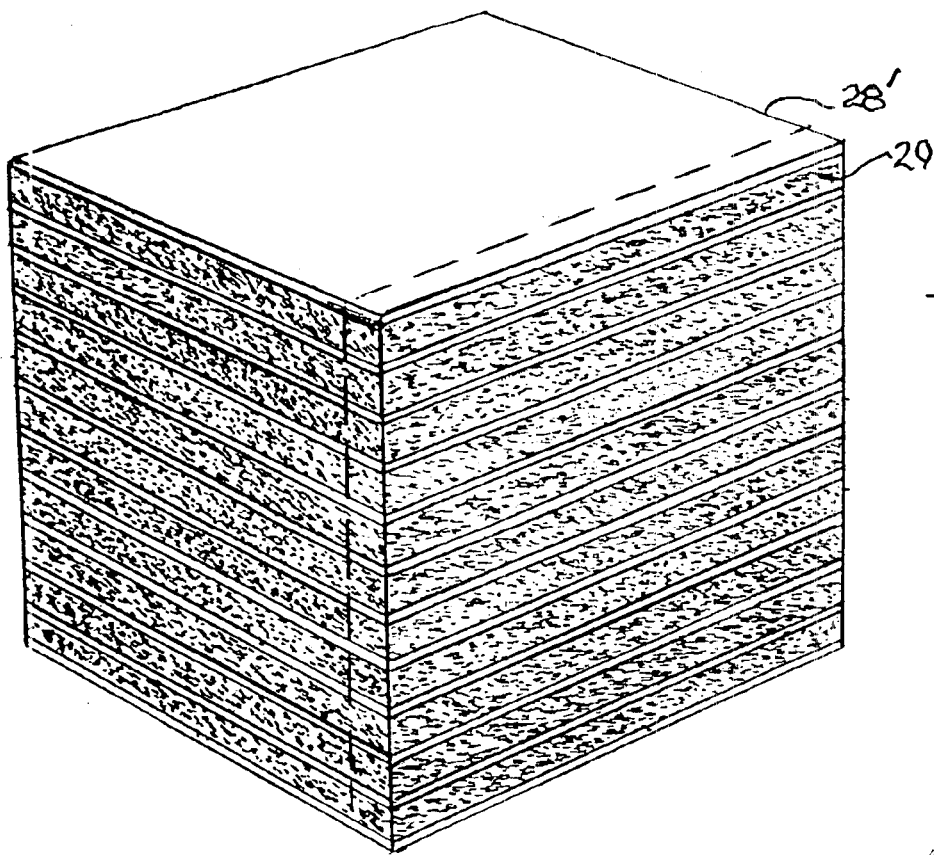
FIG. 7 illustrates a stack of filler/ply components adhesively attached.

FIG. 7 illustrates a stack 28 of filler ply components, component 29 being typical, adhesively attached to each other such that plies and filler sheets are interspersed.

Figure 8:
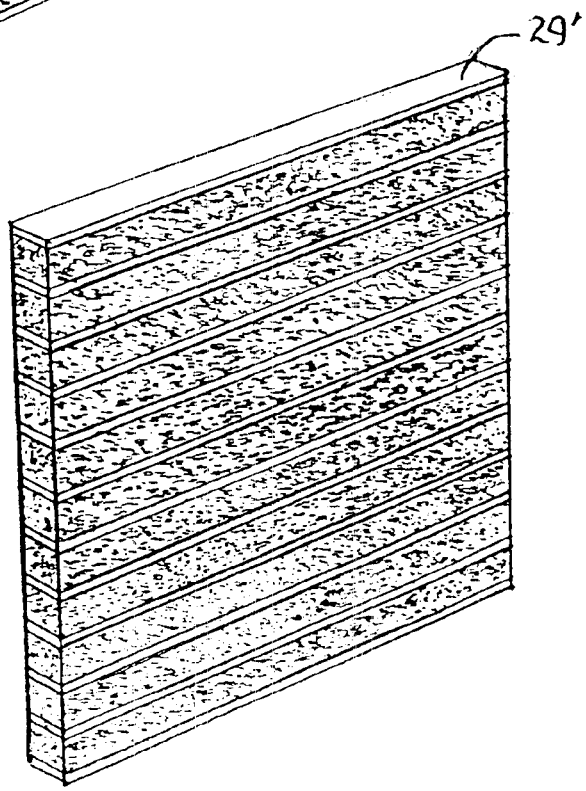
FIG. 8 illustrates a filled rib slice.

FIG. 8 illustrates a filled rib slice 29 made by slicing the filler ply component stack perpendicular to the rib, as indicated by the dashed lines in FIG. 7.

Figure 9:
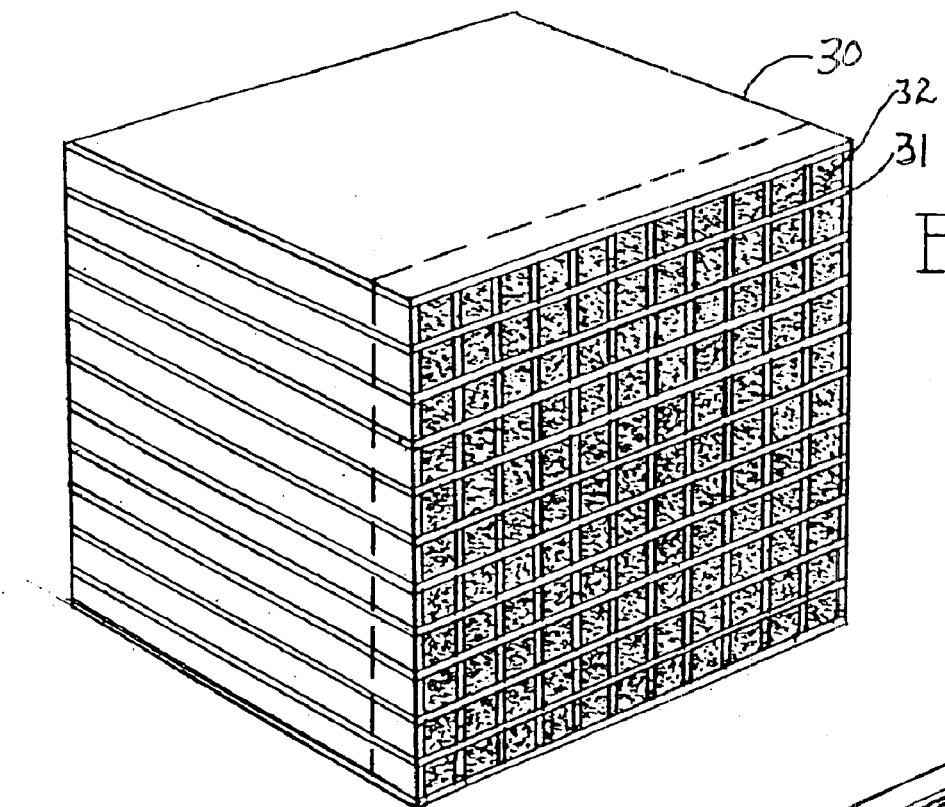
FIG. 9 illustrates a stack of plies and filled rib slices adhesively attached and stacked alternately.

FIG. 9 illustrates a stack 30 of adhesively attached plies, ply 31 for example and filled rib slices, slice 32 for example, the plies being interspersed between the slices. A filled cell core (13, FIG. 2) is made by slicing the stack of filled rib slices and plies perpendicular to the ribs, as indicated by the dashed lines.

Figure 10:
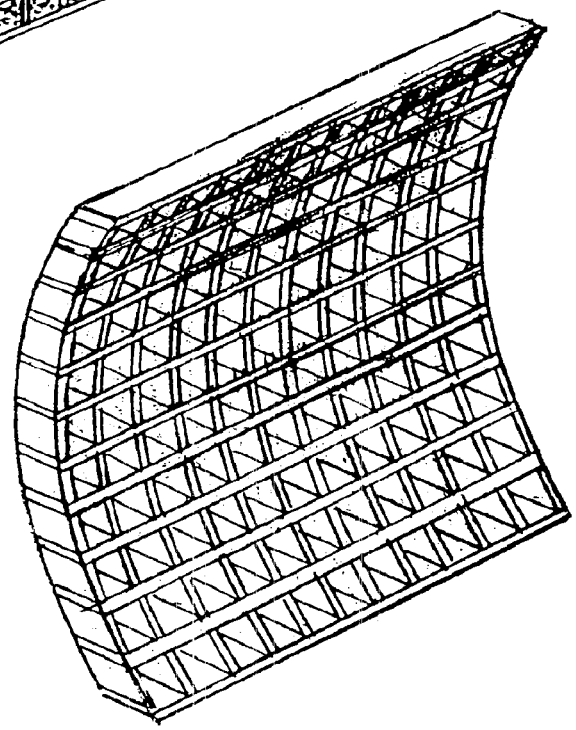
FIG. 10 illustrates a curved cellular core.

FIG. 10 illustrates a curved cellular core, made by curved cuts to slice off cellular cores.

The basic method of making cellular cores suitable to use of wood comprises the steps of:
1) providing a plurality of ribbed plies, the ribs of the ribbed plies having free edges;
2) creating a stack of ribbed plies by adhesively attaching the plurality of ribbed plies together with the ply of each ribbed ply against the free edges of an adjacent ribbed ply; and
3) creating cellular cores by cutting slices off the ribbed ply stack, cutting perpendicular to the ribs.

The method for making specifically hollow cell cellular cores comprises the steps of:
1) creating a plurality of hollow ribbed plies, FIG. 4, the ribs of each hollow ribbed ply having free edges, using the following steps:
   a) providing a plurality of plies;
   b) providing a plurality of ribs;
   c) providing a fixture for holding a plurality of ribs parallel to each other with one set of edges of the ribs in a flat plane and exposed above the fixture;
   d) installing the ribs in the fixtures;
   e) adhesively attaching a ply to the exposed edges of the ribs;
   f) allowing the adhesive used for the adhesive attachment to core; and
   g) removing the hollow ribbed ply from the fixture.
2) creating a stack of hollow ribbed plies by adhesively attaching the plurality of hollow ribbed plies together with the ply of each hollow ribbed ply against the free edges of an adjacent hollow ribbed ply; and
3) creating hollow cell cellular cores by cutting slices off the stack of hollow ribbed plies, cutting perpendicular to the ribs;

The method for making specifically a filled cell cellular core comprises the steps of:
1) providing a plurality of filled rib slices, using the following steps:
   a) providing a plurality of plies;
   b) providing a plurality of filler layers;
   c) making a stack of alternate plies and filler layers, adhesively attached to each other; and
   d) making a plurality of filled ribbed plies by slicing them from the stack, slicing perpendicular to the ribs.
   e) providing a plurality of plies;
   f) making a stack of the plies and filled rib slices, stacked alternately with all ribs parallel and adhesively attached to each other; and
   g) slicing filled cell cellular cores from the stack, cutting perpendicular to the ribs.

It is considered that all cellular core embodiments made according to the subject methods, the intersectional joints, joint 33 for example, will be of adequate strength. However, if it is indicated that there will be unusually high loads on the intersectional joints so that additional strength is required, the intersectional joints can be strengthened by any of a number of techniques, including applying a filler of thickened adhesive to at least one of the four corners of a joint.

All adhesive attachments may be augmented or replaced by mechanical fastening such as staples, nails and screws. Such augmentation may allow handling of adhesively attached assemblages before to adhesive in fully cured.

It is considered to be understandable from the above description that the subject invention meets its objectives. It provides a method which enables economically acceptable manufacture of cellular cores made of wood. This is due in part to the fact that the method does not involve the making and handling of parts which are small relative to the size of the cellular core.

It is also considered to be understood that while certain embodiments of the subject invention are disclosed, other embodiments and modifications of those disclosed are possible within the scope of the attached claims.

I claim:

1. A method of making cellular cores suitable to use of wood comprises the steps of:
   1) providing a plurality of ribbed plies, each ribbed ply comprising a flat ply having first and second flat sides, and a plurality of flat ribs, said ribs having fixed edges secured to the first side of the flat ply and opposite free edges;
   2) creating a stack of said ribbed plies by adhesively attaching said ribbed plies together with the second side of each said ply against said free edges of said ribs on an adjacent ribbed ply; and 3) creating said cellular cores by cutting slices off said stack of ribbed plies, cutting perpendicular to said ribs.

2. A method of making hollow cell cellular cores, comprising the steps of:
   1) creating a plurality of hollow ribbed plies, the ribs of each hollow ribbed ply having free edges, using the following steps:
      a) providing a plurality of plies;
      b) providing a first plurality of ribs;
      c) providing a fixture of holding a second plurality of said ribs, selected from said first plurality, parallel to each other with one set of edges of said second plurality of ribs in a flat plane and exposed above said fixture;
      d) installing, for each of said plurality of hollow ribbed plies, said second plurality of ribs in said fixture;
      e) using adhesive attachment, attaching one of said plurality of plies to said exposed edges of said second plurality of plies;
      f) allowing said adhesive attachment to cure; and
      g) removing each of said hollow ribbed plies from said fixture;
   2) creating a stack of said hollow ribbed plies by adhesively attaching said plurality of hollow ribbed plies together with said ply of each of said hollow ribbed plies against said free edges of an adjacent one of said hollow ribbed plies; and
   3) creating a plurality of said hollow cell cellular cores by cutting slices of said stack of hollow ribbed plies, cutting perpendicular to said ribs.

3. A method of making a core for building panel, comprising:
   providing a plurality of ply sheets, each having a first side and a second side;
   a) providing a plurality of ribs for each ply sheet, each said rib having a first edge and a second edge;
   supporting the ribs for each ply sheet in spaced-apart parallelism, with the first edges of the ribs contacting the first side of the ply sheet, and gluing the first edges of the ribs to the first side of the ply sheet so that the ribs project perpendicularly from the ply sheet in spaced apart parallelism, with their second edges substantially within a common plane that is spaced from and parallel to the ply sheet, so as to produce a ribbed ply composed of the ply sheet and ribs;
   stacking the ribbed plies with the second side of each ply sheet in contact with the second edges of the ribs on an adjacent ply sheet; and gluing the second edges of the ribs to the ply sheets they contact; and
   following completion of the stacking of the ribbed plies, slicing the stack across the ribs, so as to create a plurality of cellular core members, each composed of the sliced plies and ribs.

4. The method of claim 3, further comprising:
   providing a fixture for holding the ribs parallel to each other with the first edges of the ribs in a flat plane and exposed above the fixture;
   mounting the ribs for a ribbed ply in said fixture, in parallel to each other and with the upper edges of the ribs in a flat plane exposed above the fixture;
   adhesively attaching the ply sheet to the first edges of said ribs; and
   allowing the adhesive to cure and then removing the ply sheet and the ribs from the fixture.

* * * * *